United States Patent
Rus

[11] Patent Number: 5,906,414
[45] Date of Patent: May 25, 1999

[54] SNAP-ON, PIVOTABLE VEHICLE HEADREST ASSEMBLY

[75] Inventor: Liviu Rus, Troy, Mich.

[73] Assignee: Lear Corporation, Southfield, Mich.

[21] Appl. No.: 08/947,851

[22] Filed: Oct. 9, 1997

[51] Int. Cl.$^6$ ...................................................... A47C 7/38
[52] U.S. Cl. ........................... 297/408; 297/397; 297/400; 297/220
[58] Field of Search .................................. 297/408, 397, 297/400, 391, 220

[56] References Cited

U.S. PATENT DOCUMENTS

| | | | |
|---|---|---|---|
| 4,003,599 | 1/1977 | Takamatsu | 297/222 |
| 4,190,291 | 2/1980 | Korger | 297/408 |
| 4,527,833 | 7/1985 | Parker | 297/408 X |
| 4,779,928 | 10/1988 | Collier et al. | 297/408 X |
| 4,807,933 | 2/1989 | Alexander | 297/391 |
| 4,844,544 | 7/1989 | Ochiai | 297/408 |
| 4,848,836 | 7/1989 | Masui | 297/220 |
| 4,991,907 | 2/1991 | Tanaka | 297/408 |
| 5,139,310 | 8/1992 | Itoh | 297/220 X |
| 5,213,392 | 5/1993 | Bostrom et al. | 297/408 X |
| 5,257,853 | 11/1993 | Elton et al. | 297/391 |
| 5,261,726 | 11/1993 | Yanagishita | 297/408 |
| 5,316,372 | 5/1994 | Amner | 297/400 |
| 5,328,244 | 7/1994 | Ishihara et al. | 297/397 X |
| 5,348,376 | 9/1994 | Natori | 297/391 |
| 5,398,996 | 3/1995 | Steiner | 297/391 |
| 5,660,441 | 8/1997 | Nagayasu et al. | 297/408 |
| 5,683,141 | 11/1997 | Wakamatsu et al. | 297/408 |
| 5,700,057 | 12/1997 | De Filippo | 297/408 |

FOREIGN PATENT DOCUMENTS

| | | | |
|---|---|---|---|
| 3413453 | 10/1985 | Germany | 297/220 |

*Primary Examiner*—Peter M. Cuomo
*Assistant Examiner*—Rodney B. White
*Attorney, Agent, or Firm*—Brooks & Kushman P.C.

[57] ABSTRACT

A vehicle headrest assembly includes a one-piece blow-molded hollow elongated plastic body having a channel formed therein with a mouth portion having a mouth width. A substantially U-shaped support rod includes a cross member extending between first and second support legs. The cross member is configured with a cross-sectional width slightly greater than the mouth width to facilitate a snap-fit relationship of the cross member within the channel as the cross member is inserted through the mouth portion.

14 Claims, 3 Drawing Sheets

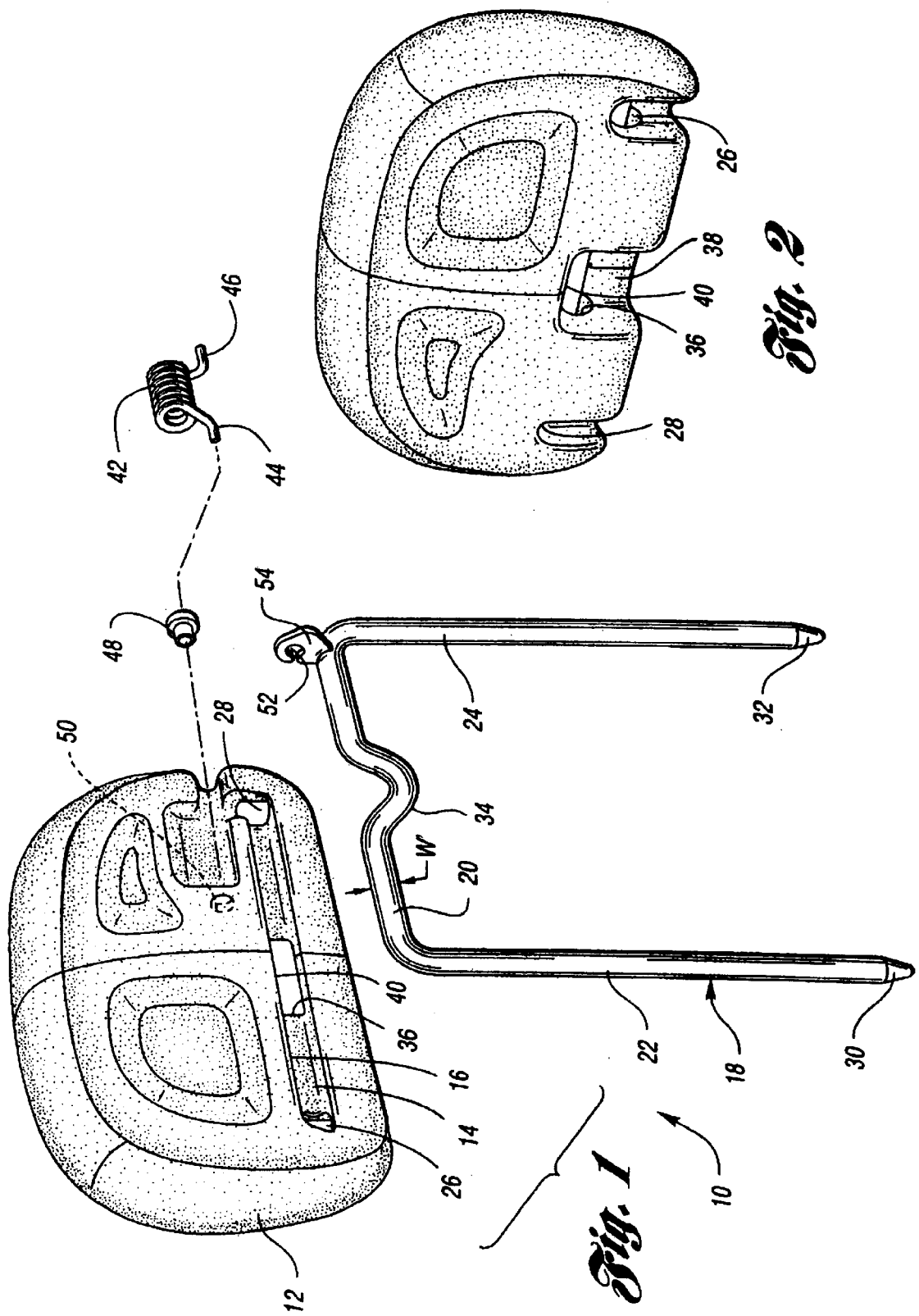

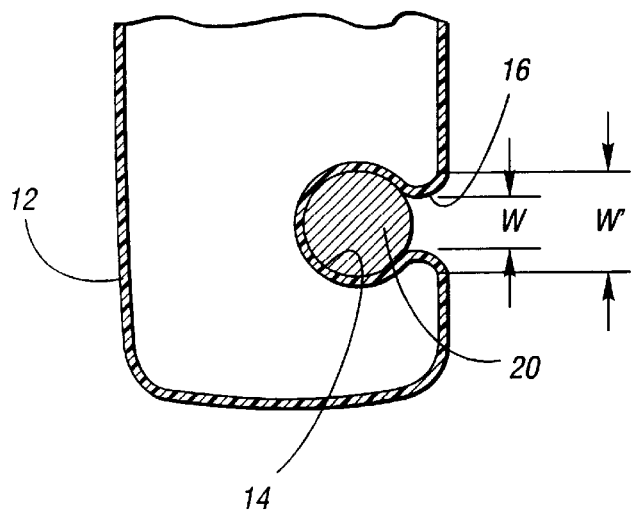
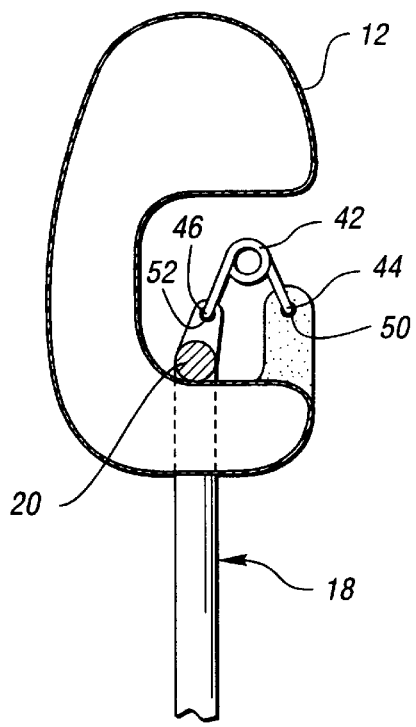
Fig. 5
Fig. 6
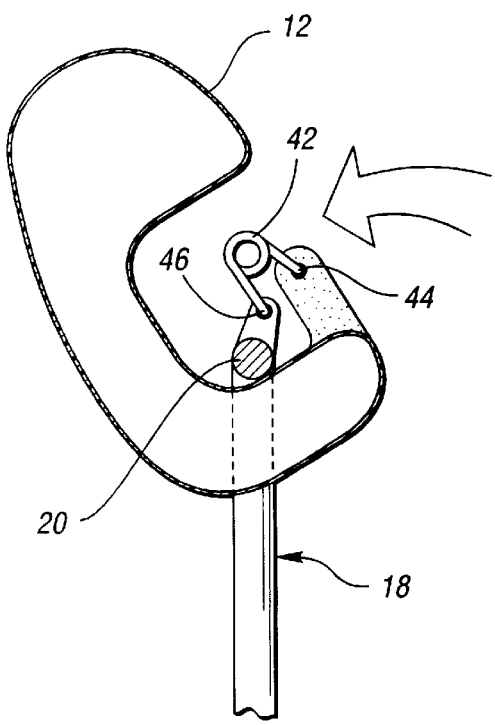
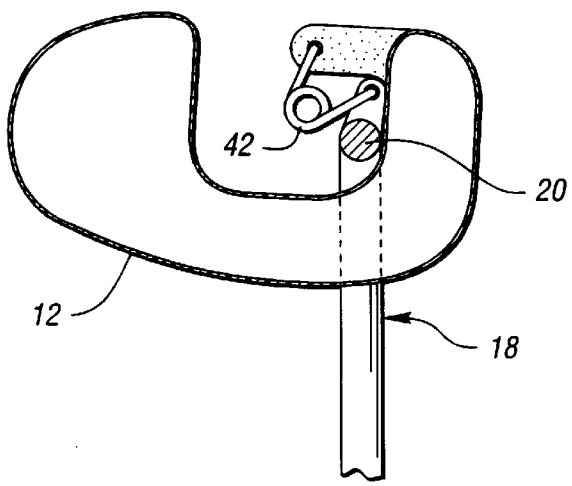
Fig. 7
Fig. 8

SNAP-ON, PIVOTABLE VEHICLE HEADREST ASSEMBLY

TECHNICAL FIELD

The present invention relates to a motor vehicle headrest structure, and more particularly to a headrest assembly including a one-piece blow-molded hollow plastic body which snaps onto the cross member of a substantially U-shaped support rod for pivotal movement thereon.

BACKGROUND OF THE INVENTION

Headrests of various designs and construction are used in automobiles and other motor vehicles for head support. Such headrests typically consist of a metal or plastic body surrounded by suitable padding and a cover, supported on a post extending upwardly from the motor vehicle seat back. The body provides a framework to support the padding and cover of the headrest assembly. Such headrests may be adjustable with respect to the seat back.

Previous motor vehicle headrests have utilized bodies made of metal or plastic, typically formed to provide, when covered with padding, a flat or convex finished surface adjacent the passenger's head. Typical post supports used in motor vehicle headrests have included one-piece inverted U-shaped posts and hollow metal tubes. Means for attaching the body to the support post have included welding and insert molding of the body around the post.

When the headrest body is made from blow-molded or injection molded plastic, the post may be joined integrally to the body by providing the post support as a mold insert. However, the use of mold inserts presents several potential disadvantages. The insertion of the post members into the mold during manufacture can be complicated and expensive.

In addition, the presence of metal insert elements in the molded part may also cause uneven cooling and dimensional distortion of the plastic armature. Additionally, removal of flash or other excess material from the finished assembly may be more difficult because of the protruding metal insert. Finally, should one or more of the component pieces shift during the molding process, it may be difficult to rework, repair or salvage the assembly or its components.

Other headrest assemblies generally require various fasteners, such as bolts and nuts for attaching the headrest body to the support rod, and require bushings to allow the pivoting of the headrest body with respect to the support rod. Such fastener and bushing components increase the part count for the headrest assembly and require significant handling, which adds cost to the manufacturing process.

Accordingly, a need has remained for an improved headrest armature design that may be produced reliably at reduced cost.

Another more recent requirement for certain vehicle headrest designs is that the headrest be pivotable between upright and stowed positions, particularly for use with removable or collapsible rear seat assemblies used in trucks and minivans. It is particularly desirable that the headrest be substantially self-locking in both the upright and stowed positions.

DISCLOSURE OF THE INVENTION

The present invention presents several improvements over the previous motor vehicle headrest structures. Particularly, the present invention provides a one-piece blow-molded hollow elongated plastic body with a channel formed therein for receiving the cross member of a substantially U-shaped support rod. The channel is configured to facilitate a snap-in relationship of the cross member within the channel as the cross member is inserted into the channel. Accordingly, no further fasteners or bushings are required for attachment, or for allowing pivotal movement of the body with respect to the support rod.

Another aspect of the invention provides an over-center spring operatively positioned between the plastic body and the support rod for alternatively biasing the body toward a stowed position and an upright position.

More specifically, the present invention provides a vehicle headrest assembly including a one-piece blow-molded hollow elongated plastic body having a channel formed therein with a mouth portion having a mouth width. A substantially U-shaped support rod includes a cross member extending between first and second support legs. The cross member is configured with a cross-sectional width slightly greater than the mouth width to facilitate a snap-fit relationship of the cross member within the channel as the cross member is inserted through the mouth portion.

In the preferred embodiment, the body includes first and second throughholes formed at opposing ends of the channel to receive the first and second support legs therethrough. The cross member also preferably includes a downturned portion, and the plastic body forms a cutout portion therethrough in communication with the channel for cooperation with the downturned portion for limiting pivotal movement of the body with respect to the support rod to approximately 90°.

In the preferred embodiment, the plastic body is pivotable between upright and stowed positions. The assembly also preferably includes an over-center spring operatively connected between the plastic body and the support rod for alternatively biasing the plastic body toward the stowed position and upright position.

Accordingly, an object of the present invention is to provide a vehicle headrest assembly which includes a plastic body which snaps onto a support rod in order to eliminate the need for any fasteners or bushings for attachment for pivotal movement.

A further object of the present invention is to provide a vehicle headrest assembly which is pivotable between stowed and upright positions, wherein the assembly includes an over-center spring for alternatively biasing the plastic body toward the stowed position and upright position.

Another object of the present invention is to provide a vehicle headrest assembly which may be produced at reduced cost.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 shows an exploded rear perspective view of a vehicle headrest assembly in accordance with the present invention;

FIG. 2 shows a perspective front view of a plastic headrest body in accordance with the present invention;

FIG. 5 shows a cut-away cross-sectional view taken at line 5—5 of FIG. 3;

FIG. 6 shows a schematically arranged side view of a headrest assembly in accordance with the present invention with the headrest in the upright position;

FIG. 7 shows a schematically arranged side view of the headrest assembly of FIG. 6 with the headrest body pivoting between the upright and stowed positions; and FIG. 8 shows a schematically arranged side view of the vehicle headrest assembly of FIG. 6 with the headrest body in the stowed position.

DETAILED DESCRIPTION OF THE PREFERRED EMBODIMENT

Figure 3:
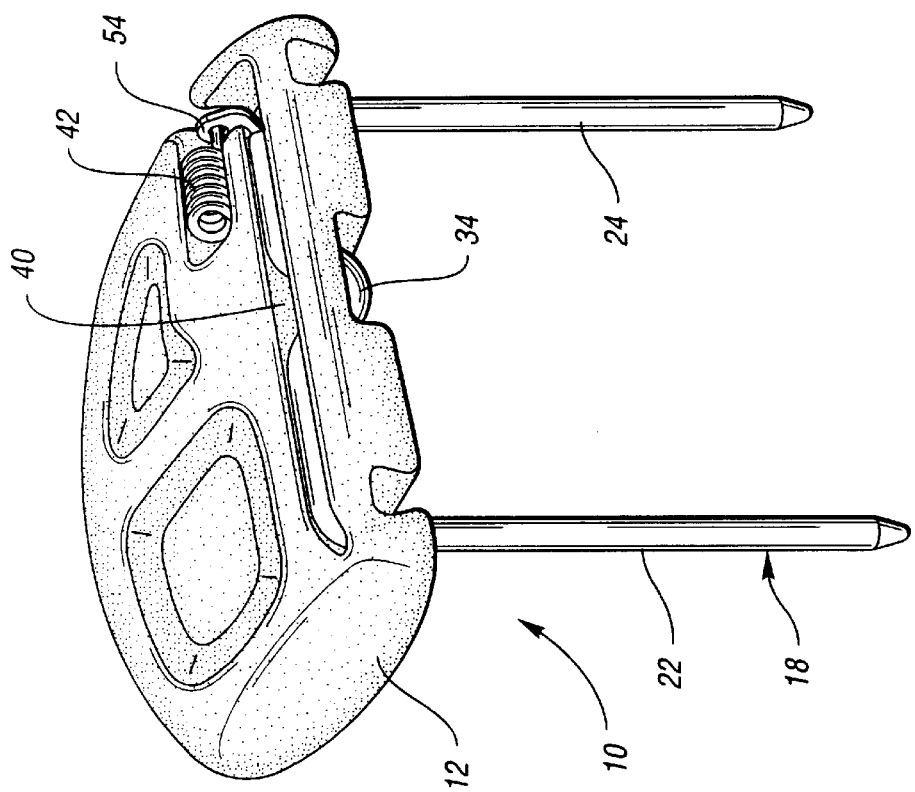
FIG. 3 shows a rear perspective view of a vehicle headrest assembly shown in the upright position in accordance with the present invention.

FIGS. 1–5 illustrate various views of a vehicle headrest assembly in accordance with a preferred embodiment of the invention, and FIGS. 6–8 schematically illustrate the functionality of the torsion spring used with the present invention, as described in FIGS. 1–5.

As shown in FIGS. 1–5, the vehicle headrest assembly 10 of the present invention includes a one-piece blow-molded hollow elongated plastic body 12 having a channel 14 formed therein with a mouth portion 16. As shown in FIG. 5, the mouth portion 16 has a mouth width W.

The one-piece blow molded hollow elongated plastic body 12 is adapted to support a foam cushion and trim cover for use as a vehicle seat headrest.

The vehicle headrest assembly 10 also includes a substantially U-shaped support rod 18 adapted for mounting the one-piece blow-molded hollow elongated plastic body 12 onto a vehicle seat back. The substantially U-shaped support rod 18 includes a cross member 20 extending between first and second support legs 22,24. The cross member 20 is configured with a cross-sectional width W' which is slightly greater than the channel mouth width W in order to facilitate a snap-fit relationship of the cross member 20 within the channel 14 as the cross member 20 is inserted through the mouth portion 16.

The plastic body 12 further includes first and second through holes 26,28 formed at opposing ends of the channel 14 to receive the first and second support legs 22,24 of the U-shaped support rod 18.

The U-shaped support rod 18 is assembled with the plastic body 12 by first inserting the ends 30,32 of the U-shaped support rod 18 through the first and second through holes 26,28. The legs 22,24 are inserted fully through the through holes 26,28 until the cross member 20 of the support rod 18 engages against the mouth portion 16 of the channel 14. Because the mouth width W of the mouth portion 16 is slightly lesser than the cross-sectional width W' of the cross member 14, the cross member 20 must be snapped into position within the channel 14 by forcing the cross member 20 past the mouth portion 16. Because the plastic body 12 is a blow-molded plastic component, the mouth portion 16 will separate slightly to allow entry of the cross member 20 into the channel 14. Thus, the snap-fit relationship is facilitated.

With the cross member 20 positioned within the channel 14, the cross member 20 is freely rotatable with respect to the channel 14, which allows pivoting movement of the plastic body 12 with respect to the support rod 18.

This configuration requires no additional attachment features to allow attachment of the headrest body 12 to the support rod 18, and requires no bearings, sleeves, or other devices to allow rotation of the headrest body 12 with respect to the support rod 18 because the plastic channel 14 will tightly grasp the cross member 20 while allowing the smooth pivotal movement of the cross member 20 with respect to the channel 14.

The headrest assembly 10 is configured to allow approximately 90° of pivotal rotation of the plastic body 12 with respect to the support rod 18. This is achieved by the downturned portion 34 which extends from the cross member 20 and cooperates with the cutout portion 36, which extends through the plastic body 12 in communication with the channel 14, to limit the range of pivotal movement. The cutout portion 36 includes a lower wall 38 and upper wall 40, as shown in FIGS. 1 and 2, which cooperate with the downturned portion 34 of the cross member 24 to limit pivotal movement of the plastic body 12 with respect to the support rod 18 by abutting the downturned portion 34. Also, the legs 22,24 cooperate with the walls of apertures 26,28 to limit such pivotal movement, thereby distributing the load across the body 12.

Figure 4:
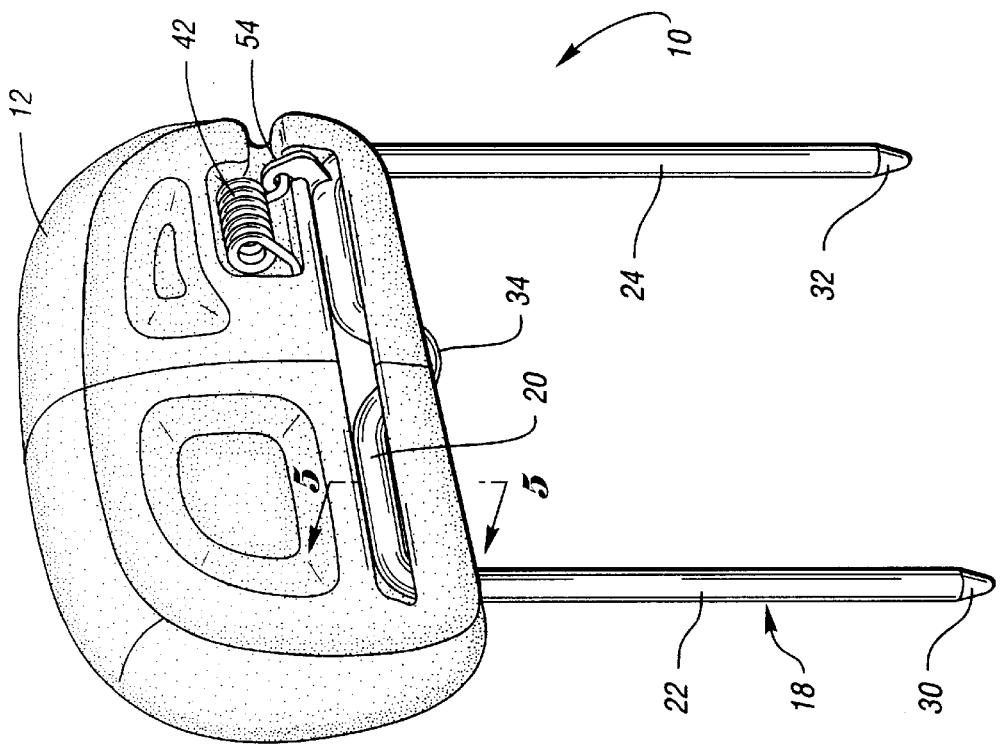
FIG. 4 shows a rear perspective view of a vehicle headrest assembly with the headrest in the stowed position in accordance with the present invention.

When the plastic body 12 is in the upright position with respect to the support rod 18, the downturned portion 34 of the cross member 20 abuts against the lower wall 38 (shown in FIG. 2) to prevent further pivotal movement. Referring to FIG. 4, when the plastic body 12 is in the folded position, the downturned portion 34 abuts against the upper wall 40 of the cutout portion 36 to prevent further pivotal movement. Accordingly, the downturned portion 38 cooperates with the lower wall 38 and upper wall 40 of the cutout portion 36 to limit pivotal movement of the plastic body 12 with respect to the support rod 18 to approximately 90°.

Returning to FIG. 1, an over-center torsional spring 42 is provided with opposing ends 44,46 for alternatively biasing the plastic body 12 toward the upright or folded position. The first end 44 of the over-center spring 42 is installed within a bushing 48 in a body aperture 50. The second end 46 of the over-center spring 42 is secured within a bushing in an opening 52 formed within a hook 54 extending from the support rod 18. Of course, different types of springs could be used, such as an extension spring, etc.

Turning to FIGS. 6–8, a series of schematic side views are shown illustrating the over-center functionality of the over-center torsional spring 42. As shown in FIG. 6, the plastic body 12 is in the upright position with respect to the support rod 18, and the torsional spring 42 biases the plastic body 12 in a clockwise direction about the cross member 20 to maintain the plastic body 12 in the upright position.

As shown in FIG. 7, the plastic body 12 is being pivoted from the upright to the folded position, and the over-center spring 42 is compressed until a threshold point is reached when the cross member 20 is in alignment with both ends 44,46 of the spring 42, and then the spring 42 reverses its bias, which forces the plastic body 12 to the folded position shown in FIG. 8. When in the folded position, the torsional spring 42 biases the plastic body 12 in a counterclockwise direction about the cross member 20 in order to maintain the plastic body 12 in the folded position. When in the folded position, the headrest assembly is configured to allow pivotal movement of the seat back for avoiding interference with adjacent vehicle components to allow collapsing and stowing of the seat assembly in certain design configurations.

Accordingly, the embodiment described herein achieves the objects of the invention by providing a snap-fit relationship between the cross member 20 of the support rod 18 and the channel 14 of the plastic body 12 in order to eliminate the need for attachment features and bearings to allow pivotal movement. The over-center spring 42 is operative to automatically bias the plastic body 12 of the headrest assembly in folded or upright positions to secure the plastic body 12 in the respective position.

While the best mode for carrying out the invention has been described in detail, those familiar with the art to which this invention relates will recognize various alternative designs and embodiments for practicing the invention within the scope of the appended claims.

What is claimed is:

1. A vehicle headrest assembly, comprising:
   a one-piece blow-molded hollow elongated plastic body having a channel formed therein with a mouth portion having a mouth width;
   a substantially U-shaped support rod including a cross member extending between first and second support legs, wherein the cross member is configured with a cross-sectional width slightly greater than said mouth width to facilitate a snap-fit relationship of the cross member within the channel as the cross member is inserted through the mouth portion; and
   wherein the body includes first and second through-holes formed at opposing ends of the channel to receive the first and second support legs therethrough.

2. The vehicle headrest assembly of claim 1, wherein the body is configured to allow 90° of pivotal movement with respect to the support rod.

3. The vehicle headrest assembly of claim 2, wherein the cross member includes a downturned portion and the plastic body forms a cutout portion therethrough in communication with the channel for cooperation with the downturned portion to limit said pivotal movement.

4. The vehicle headrest assembly of claim 1, wherein said plastic body is pivotable between upright and stowed positions, and the assembly further comprises an over-center spring operatively connected between the plastic body and the support rod for alternatively biasing the plastic body toward the stowed position and upright position.

5. The vehicle headrest assembly of claim 4, wherein the support rod includes a hook extending therefrom, and the plastic body includes a spring aperture formed therein, and wherein said over-center spring comprises a torsional spring with opposing ends secured, respectively, to the hook and the spring aperture.

6. A vehicle headrest assembly, comprising:
   a one-piece blow-molded hollow elongated plastic body having a channel formed therein with a mouth portion having a mouth width;
   a substantially U-shaped support rod including a cross member extending between first and second support legs, wherein the cross member is configured with a cross-sectional width slightly greater than said mouth width to facilitate a snap-fit relationship of the cross member within the channel as the cross member is inserted through the mouth portion; and
   wherein the plastic body is pivotable between upright and stowed positions, and the assembly further comprises an over-center spring operatively connected between the plastic body and the support rod for alternatively biasing the plastic body toward the stowed position and upright position.

7. The vehicle headrest assembly of claim 6, wherein the support rod includes a hook extending therefrom, and the plastic body includes a spring aperture formed therein, and wherein said over-center spring comprises a torsional spring with opposing ends secured, respectively, to the hook and the spring aperture.

8. The vehicle headrest assembly of claim 6, wherein the body includes first and second through-holes formed at opposing ends of the channel to receive the first and second support legs therethrough.

9. The vehicle headrest assembly of claim 6, wherein the body is configured to allow 90° of pivotal movement with respect to the support rod.

10. The vehicle headrest assembly of claim 9, wherein the cross member includes a downturned portion and the plastic body forms a cutout portion therethrough in communication with the channel for cooperation with the downturned portion to limit said pivotal movement.

11. A vehicle headrest assembly, comprising:
    a one-piece blow-molded hollow elongated plastic body having a channel formed therein with a mouth portion having a mouth width;
    a substantially U-shaped support rod including a cross member extending between first and second support legs, wherein the cross member is configured with a cross-sectional width slightly greater than said mouth width to facilitate a snap-fit relationship of the cross member within the channel as the cross member is inserted through the mouth portion, and wherein the body is pivotable with respect to the support rod; and
    wherein the cross member includes a downturned portion and the plastic body forms a cutout portion therethrough in communication with the channel for cooperation with the downturned portion to limit pivotal movement of the body with respect to the support rod to approximately 90°.

12. The vehicle headrest assembly of claim 11, wherein the body includes first and second throughholes formed at opposing ends of the channel to receive the first and second support legs therethrough.

13. The vehicle headrest assembly of claim 11, wherein said plastic body is pivotable between upright and stowed positions, and the assembly further comprises an over-center spring operatively connected between the plastic body and the support rod for alternatively biasing the plastic body toward the stowed position and upright position.

14. The vehicle headrest assembly of claim 13, wherein the support rod includes a hook extending therefrom, and the plastic body includes a spring aperture formed therein, and wherein said over-center spring comprises a torsional spring with opposing ends secured, respectively, to the hook and the spring aperture.

* * * * *